United States Patent [19]

Shimizu

[11] Patent Number: 5,117,888
[45] Date of Patent: Jun. 2, 1992

[54] RADIAL TIRE WITH REINFORCING LAYER IN BEAD REGION

[75] Inventor: Kunihiko Shimizu, Osaka, Japan

[73] Assignee: The Ohtsu Tire & Rubber Co. Ltd., Osaka, Japan

[21] Appl. No.: 352,402

[22] Filed: May 16, 1989

[30] Foreign Application Priority Data

May 30, 1988 [JP] Japan .................. 63-133687

[51] Int. Cl.$^5$ .............................................. B60C 15/00
[52] U.S. Cl. ................... 152/540; 152/546; 152/555
[58] Field of Search ............... 152/539, 541, 542, 543, 152/546, 555

[56] References Cited

U.S. PATENT DOCUMENTS

| | | | |
|---|---|---|---|
| 3,557,860 | 1/1971 | Maiocchi | 152/543 |
| 3,612,138 | 10/1971 | Ravenhall | 152/555 |
| 4,166,491 | 9/1979 | Mezzanotte | 152/555 |
| 4,669,519 | 6/1987 | Togashi | 152/454 |
| 4,735,249 | 4/1988 | Kabe | 152/542 |

FOREIGN PATENT DOCUMENTS 995645 6/1965 United Kingdom ............... 152/543

*Primary Examiner*—Michael W. Ball
*Attorney, Agent, or Firm*—Sixbey, Friedman, Leedom & Ferguson

[57] ABSTRACT

A radial tire including at least one carcass layer extending from one of a pair of bead cores to the other bead core and composed of cords arranged radially of the tire, a belt layer provided over the crown portion of the carcass layer radially outwardly of the tire, and a bead filter rubber portion positioned on each bead core and extending radially outwardly of the tire, the carcass layer having opposite ends folded over the respective bead cores from the bead toe side toward the bead heel side, forming return portions, at least one of the return ends portion being positioned radially outwardly of the radial outer end of the bead filler rubber portion. The tire has a reinforcing layer of organic fiber having a bias angle of 40 to 60 degrees and adhered to the inner side of the bead filter rubber portion, the reinforcing layer extending along the filler rubber portion from a position radially inwardly of the bead core, and a rubber cushion having 0.5 to 1.0 times the gauge of the carcass layer and provided between the carcass folded portion and an abrasion rubber member adjacent a rim flange, the rubber cushion extending along the bead filler portion.

5 Claims, 5 Drawing Sheets

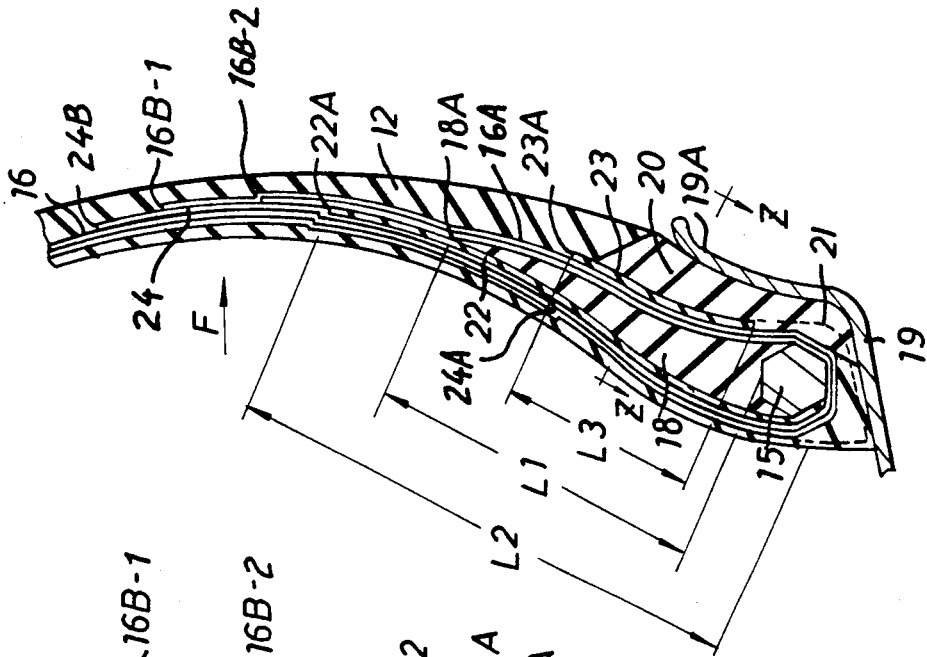
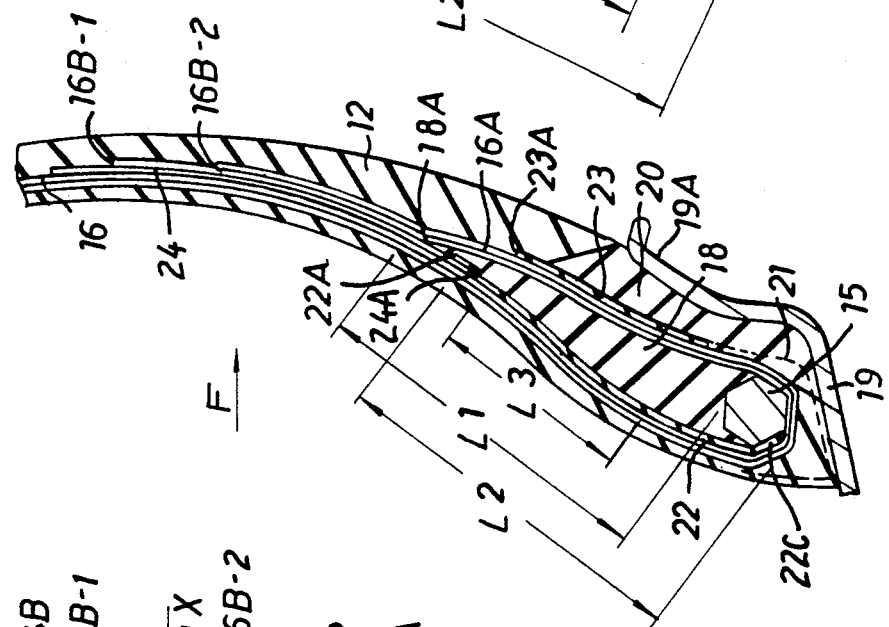
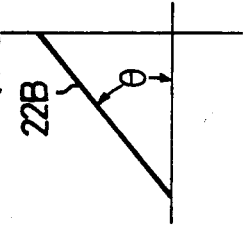
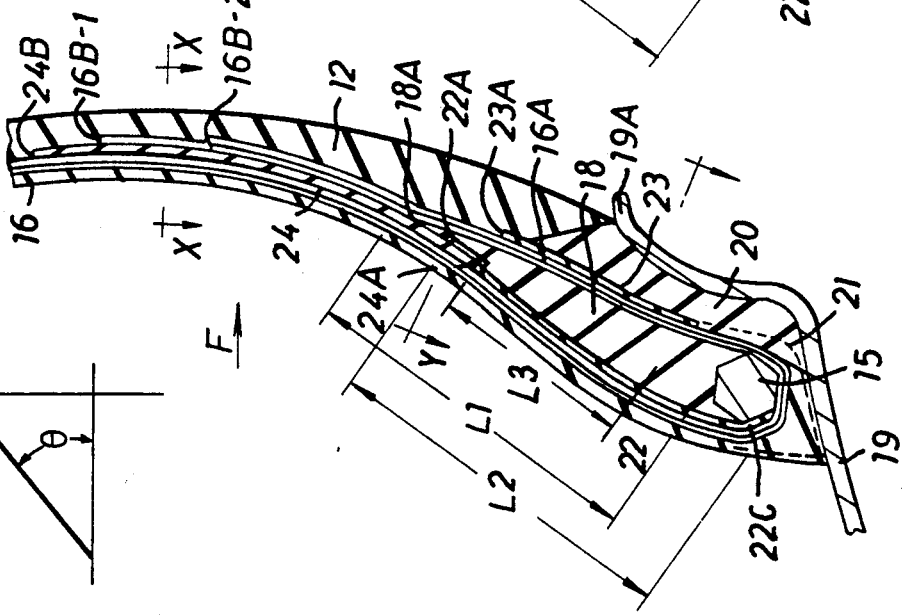

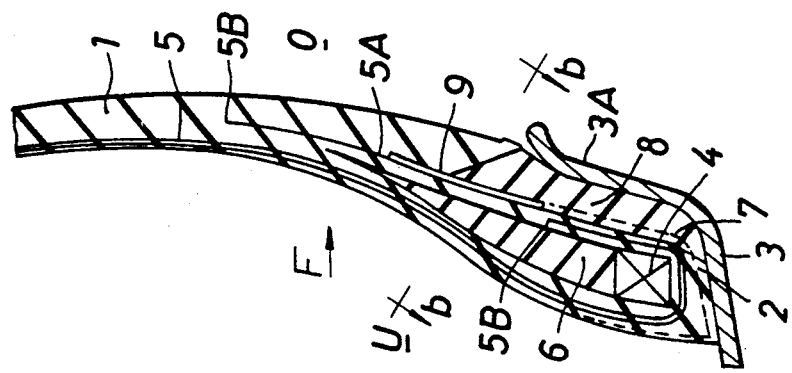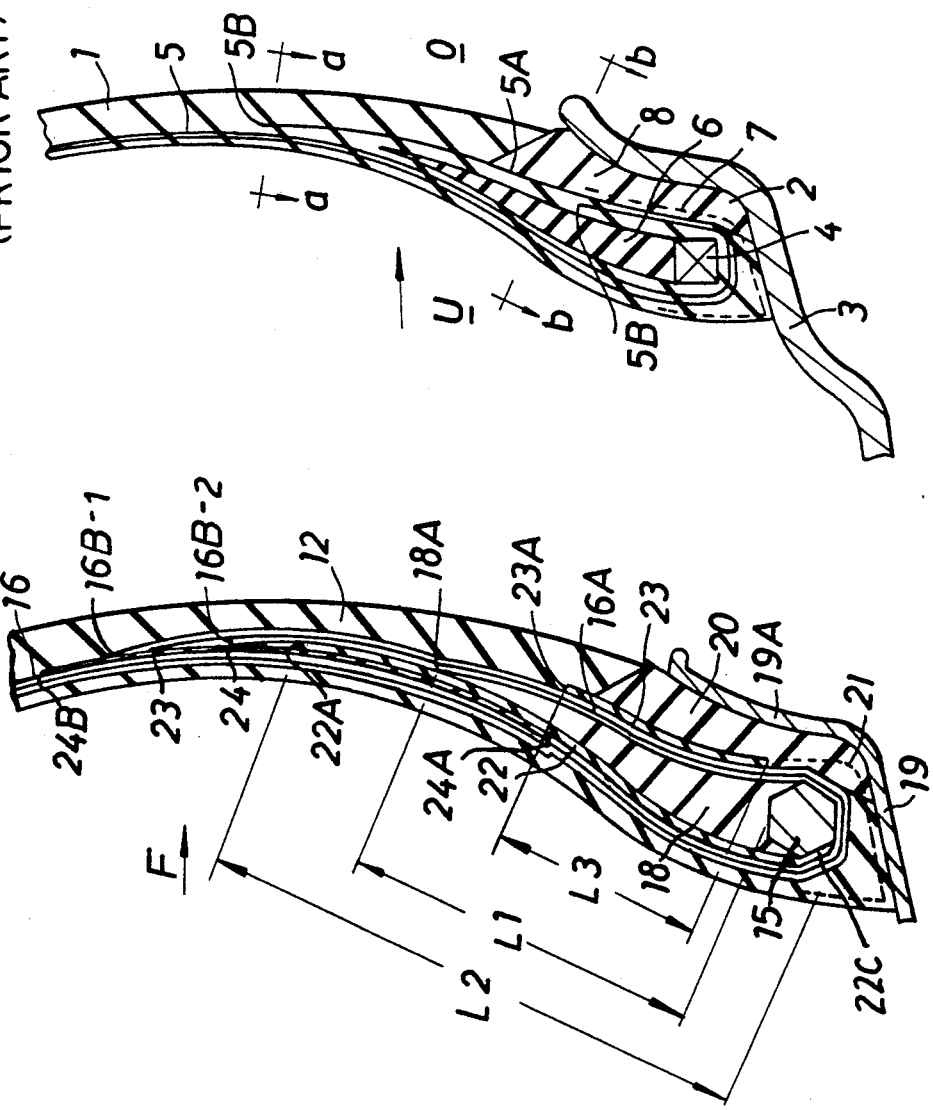

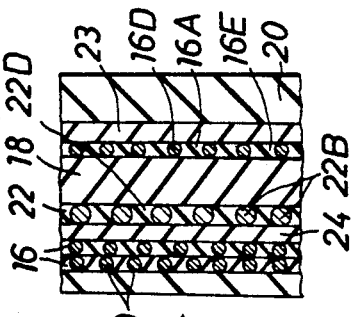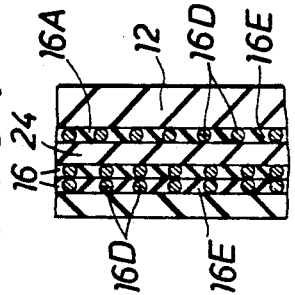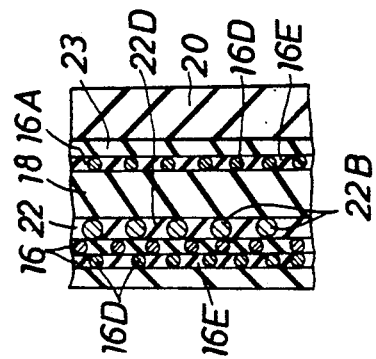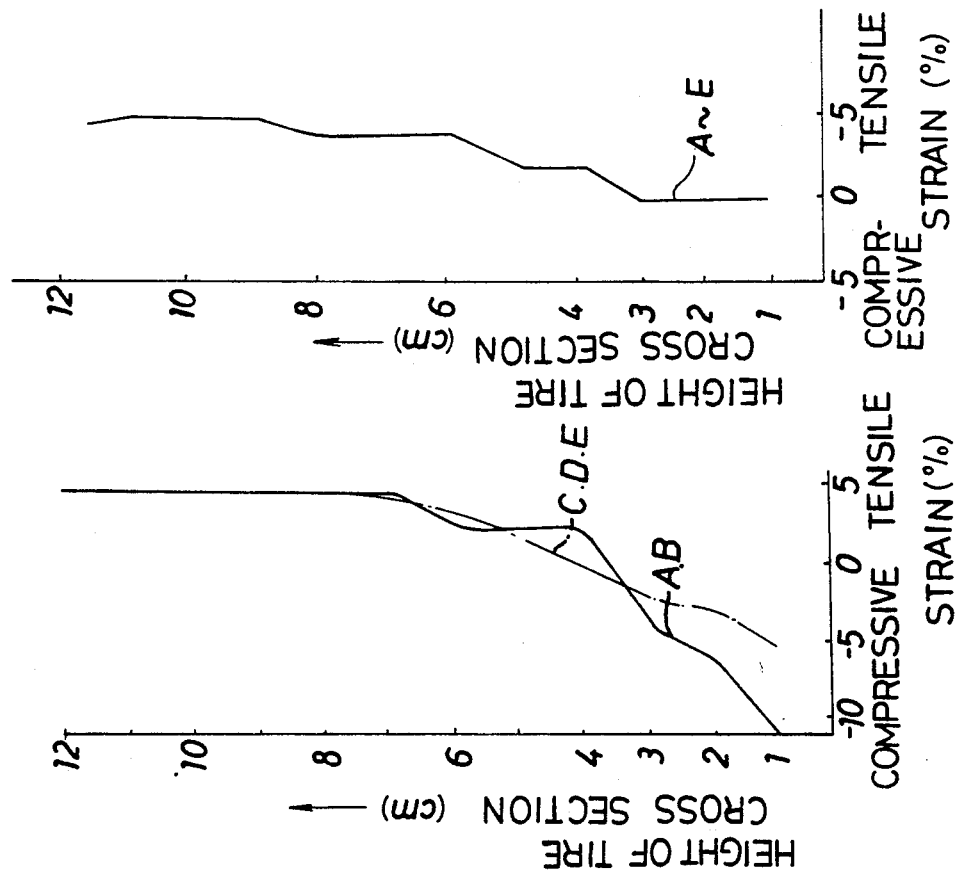

RADIAL TIRE WITH REINFORCING LAYER IN BEAD REGION

FIELD OF THE INVENTION AND RELATED ART STATEMENT

The present invention relates to radial tires, and more particularly to radial tires having high durability to withstand continuous driving under a high load.

Conventional radial tires comprise at least one carcass layer extending from one of a pair of bead cores to the other bead core and composed of cords arranged radially of the tire, a belt layer provided over the crown portion of the carcass layer radially outwardly of the tire, and a bead filler rubber portion positioned on each bead core and extending radially outwardly of the tire. Each end of the carcass layer is folded over the bead core from the bead toe side toward the bead heel side, and at least one of the folded-over ends is positioned radially outwardly of the radial outer end of the bead filler rubber portion.

With reference to FIG. 11 showing part of a radial tire as a conventional example 1, the tire has a side wall 1, and a bead 2 is fitted around a rim 3. In cross section, a carcass layer 5 extends from one bead core 4 to the other bead core 4. Each end of the carcass layer 5 is folded over the bead core 4 from the bead toe side toward the bead heel side.

Indicated at 6 is a bead filler rubber portion, at 7 a chafer and at 8 abrasion rubber.

FIG. 13 is a view in section taken along the line a—a in FIG. 11, and FIG. 14 is a view in section taken along the line b—b in FIG. 11.

FIG. 12 shows part of another tire as a conventional example 2. This tire has the same construction as the tire of the conventional example 1 except that cushion rubber 9 is provided between the abrasion rubber 8 adjacent the rim flange 3A and the carcass folded portion 5A.

The conventional example 1 has the problem that the portion of the tire in the vicinity of the rim flange 3A is susceptible to circumferential cracks in the abrasion rubber 8, breaks in the folded carcass cords and damage to the bead 2 during continuous driving under a high load. The tire has another problem in that the fold end 5B of the carcass layer 5 is liable to separate from the inside carcass portion.

More specifically, while the tire is in rotation with a load acting thereon in the direction of arrow F in FIG. 11, great radial compressive strain occurs in the tire at the outside portion O thereof (at the upper end portion of the rim flange), with tensile strain occurring in the tire inside portion U. The torsional cycle produces a shearing force between the adjacent components, leading to the foregoing problems.

Separation first occurs between the carcass folded portion 5A and the rim flange 3A and between the outer end of the chafer 7 and the folded portion 5A. The separation leads to a break in some cords of the carcass folded portion 5A and further to the separation of the carcass fold end 5B from the inside portion of the carcass layer 5.

The conventional example 2 includes the cushion rubber 9, which mitigates or absorbs the compressive strain to some extent, whereas since no measure is taken for the tensile strain in the tire inside portion U, the carcass folded portion 5A inevitably separates from the abrasion rubber 8 adjacent the rim flange 3A. Thus, the tire still remains to be improved in durability.

OBJECTS AND SUMMARY OF THE INVENTION

A first object of the present invention is to provide a radial tire wherein a reinforcing layer made of an organic fiber and having a bias angle of 40 to 60 degrees is adhered to the inner side of each bead filler rubber portion so as to extend along the filler rubber portion from a position radially inwardly of the bead core, whereby the tensile strain of the tire inside portion is inhibited to prevent the separation of the carcass folded portion from the abrasion rubber adjacent the rim flange and thereby give improved durability to the tire.

A second object of the invention is to provide a radial tire which includes, in addition to the reinforcing layer of organic fiber, a rubber cushion having 0.5 to 1.0 times the gauge of the carcass layer and provided between the carcass folded portion and the abrasion rubber adjacent the rim flange, the rubber cushion extending along the bead filler rubber portion, so as to give improved durability to the tire by mitigating the compressive strain of the tire outside portion and thereby preventing the cords of the carcass folded portion from breaking.

A third object of the invention is to provide a radial tire of the type described wherein the reinforcing layer of organic fiber has a greater length than the bead filler rubber portion radially of the tire, terminates at a position between the outer end of the bead filler rubber portion and the carcass fold end and is thereby prevented from separating from the outer end of the bead filler rubber portion to give enhanced durability to the tire.

A fourth object of the invention is to provide a radial tire wherein an inner rubber liner having 0.5 to 1.0 times the gauge of the carcass layer is interposed between the carcass folded portion and the carcass inside portion to prevent separation between the reinforcing layer and the carcass fold end and impart increased durability to the tire.

A fifth object of the invention is to provide a radial tire which has high durability and is effectively diminished in strain and which nevertheless can be produced efficiently.

Other objects and advantages of the present invention will become apparent from the following description.

The present invention provides a radial tire including at least one carcass layer extending from one of a pair of bead cores to the other bead core and composed of cords arranged radially of the tire, a belt layer provided over the crown portion of the carcass layer radially outwardly of the tire, and a bead filler rubber portion positioned on each bead core and extending radially outwardly of the tire, the carcass layer having opposite ends folded over the respective bead cores from the bead toe side toward the bead heel side, at least one of the folded ends being positioned radially outwardly of the radially outer end of the bead filler rubber portion. The tire has the following technical means.

The tire of the invention comprises a reinforcing layer of organic fiber having a bias angle of 40 to 60 degrees and adhered to the inner side of the bead filler rubber portion, the reinforcing layer extending along the filler rubber portion from a position radially inwardly of the bead core, and a rubber cushion having 0.5 to 1.0 times the gauge of the carcass layer and provided between the carcass folded portion and an abrasion rubber member adjacent a rim flange, the rubber cushion extending along the bead filler rubber portion.

When a load F acts on the radial tire of the invention during driving, the resulting compressive strain of the tire outside portion is mitigated or absorbed by the rubber cushion, while the tensile strain set up in the tire inside portion is inhibited by the reinforcing layer of organic fiber.

BRIEF DESCRIPTION OF THE DRAWINGS

FIG. 2 is an enlarged fragmentary view in section of the right-hand side of the radial tire of FIG. 1;

FIG. 4 is an enlarged fragmentary view in section showing the right-hand side of the radial tire of FIG. 3;

FIGS. 5 and 6 are enlarged fragmented sectional views showing the right-hand side of the radial tire illustrating alternative lengths L2 of the reinforcing layer in accordance with third and fourth embodiments, of the present invention respectively;

FIG. 7 is an enlarged view in section taken along the line X—X in FIG. 2;

FIG. 8 is an enlarged view in section taken along the line Y—Y in FIG. 2;

FIG. 9 is an enlarged view in section taken along the line Z—Z in FIG. 4;

FIG. 10 is a diagram showing the arrangement of organic fiber cords;

FIG. 11 is a sectional view of a conventional example 1;

FIG. 12 is a sectional view of a conventional example 2;

FIG. 16 is a graph showing the results obtained by testing some embodiments of the invention and the conventional examples for radial strains;

FIG. 17 is a graph showing the results obtained by testing the embodiments and examples for circumferential strains.

DESCRIPTION OF THE PREFERRED EMBODIMENTS

Some embodiments of the invention will be described below in detail with reference to the drawings.

Figure 1:
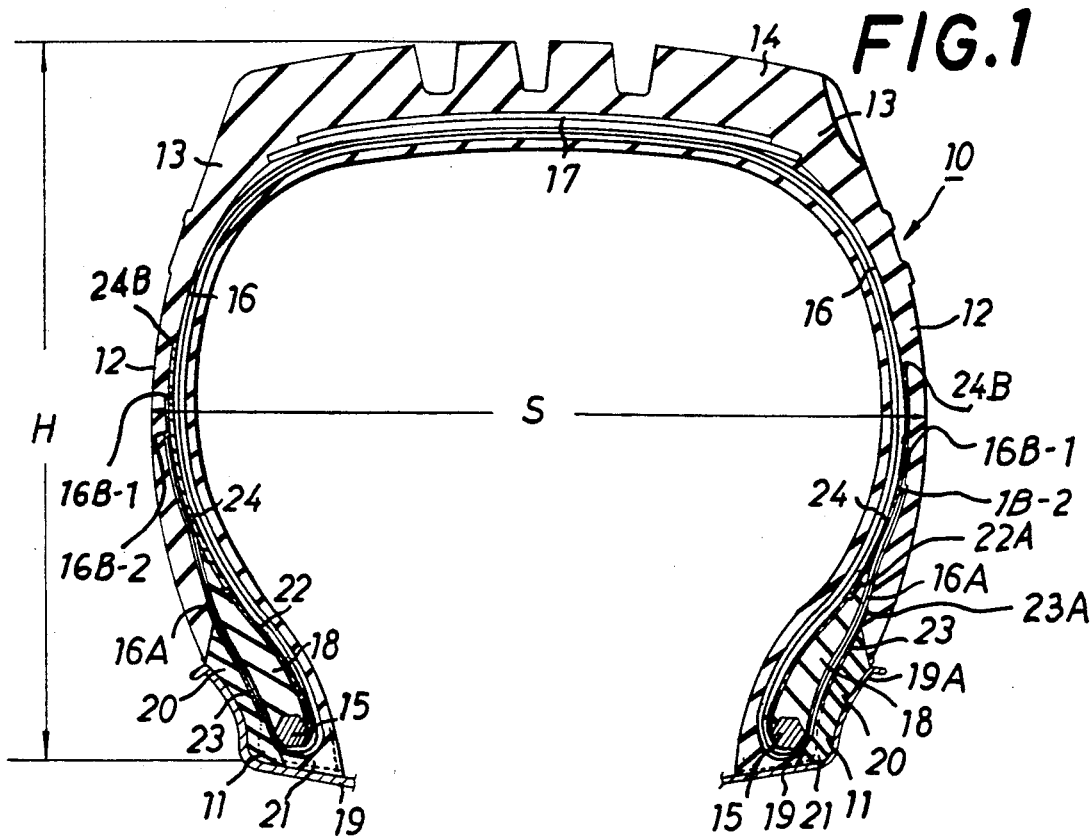
FIG. 1 is a sectional view showing a radial tire as a first embodiment of the invention.

FIG. 1 shows a radial tire 10 as a first embodiment of the invention. The tire 10 comprises a pair of beads 11 and a pair of side walls 12, and a tread portion 14 interconnecting the side walls 12, with a shoulder 13 provided between the portion 14 and each wall 12. Each bead 11 has a bead core 15 embedded therein. At least one carcass layer 16 composed of organic fiber cords arranged radially of the tire extends from one of the bead cores 15 carcass layers 16. As seen in FIGS. 7 to 9, the carcass layer 16 comprises the cords 16D covered with rubber 16E.

A belt layer 17 comprising steel cords is provided on the crown portion of the carcass 16 radially outwardly thereof.

A bead filler rubber portion 18 is positioned on each bead core 15. In cross section, the bead filler rubber portion 18 resembles a wedge and extends radially outwardly of the tire with a decreasing gauge. As seen in FIG. 2, the filler portion 18 has a length L1 equal to about 25% of the height H of the cross section of the tire.

The carcass 16 has opposite ends folded over the respective bead cores 15 from the bead toe side toward the bead heel side. The end 16B-1 of the return portion 16A is positioned at a level corresponding to about 50% of the height H of the tire cross section. At least one of the return ends 16B-1, 16B-2 is positioned radially outwardly of the radially outer end 18A of the bead filler rubber portion 18.

The bead 11 is fitted around a rim 19. To avoid abrasion, the bead 11 is provided with an abrasion rubber member 20 and a chafer 21.

The radial tire 10 is at least 0.75 in the ratio of the height H of the tire cross section to the width S of the tire cross section, i.e., H/S.

As seen in greater detail in FIG. 2, adhered to the inner side of each bead filler rubber portion 18 is a reinforcing layer 22 which comprises organic fiber cords 22B arranged at a bias angle θ of 40 to 60 degrees (see FIG. 10) and covered with rubber 22D. The reinforcing layer 22 extends along the filler rubber portion 18 from the lower edge of the bead core 15, i.e., from a position radially inwardly of the bead core. The length L2 of the reinforcing layer 22 is slightly greater than the length L1 of the filler portion 18, whereas since the layer 22 extends from the lower edge of the bead core 15, the upper end 22A of the reinforcing layer 22 is positioned slightly radially inwardly of the upper end 18A of the filler rubber portion 18.

To diminish the tensile strain of the tire inside portion resulting from a load F, the reinforcing layer 22 is provided which comprises cords 22B having a bias angle θ of 40 to 60 degrees. If the angle θ is less than 40 degrees, a satisfactory strain diminishing effect is not achieved, whereas if the angle θ exceeds 60 degrees, an excessively high reinforcing effect will result, rendering the tire inefficient to produce.

Further to mitigate and absorb the compressive strain produced by the load F in the tire outside portion, a rubber cushion 23 is provided between the carcass return portion 16A and the abrasion rubber member 20 adjacent the flange 19A of the rim 19. The rubber cushion 23 extends along the bead filler rubber portion 18 and has 0.5 to 1.5 times, preferably 0.5 to 1.0 times, the gauge of the carcass layer 16 and a length L3 not smaller than 30% of the length L1 of the filler portion 18 but smaller than the length L1.

The gauge of the rubber cushion 23 is 0.5 to 1.5 times the gauge of the layer 16 because if it is less than 0.5 times, shearing between plies will not be inhibited effectively, and further because if it is over 1.5 times, an increased weight and a cost increase will result. The outer end 23A of the rubber cushion 23 is positioned radially inwardly of the filler outer end 18A.

An inner rubber liner 24 having 0.5 to 1.5 times the gauge of the carcass layer 16 is provided between the carcass return end 16B-1 and the inside portion of the carcass layer 16 for preventing separation between the reinforcing layer 22, the filler rubber portion 18 and the return end folded end 16B-1 and adjacent rubber portions.

The rubber liner 24 has 0.5 to 1.5 times the gauge of the carcass layer 16 for the same reason as the gauge of the rubber cushion 23 which is 0.5 to 1.5 times the carcass gauge. Preferably, the gauge is 0.5 to 1.0 times.

With the first embodiment of FIG. 2, the rubber liner 24 covers the carcass return end 16B-1, outer end 18A of the filler rubber portion 18 and the outer end 22A of the reinforcing layer 22 from inside. Accordingly, the rubber liner 24 has a radially inner end 24A positioned radially inwardly of the filler outer end 22A and a radially outer end 24B positioned radially outwardly of the carcass return end 16B-1.

Figure 3:
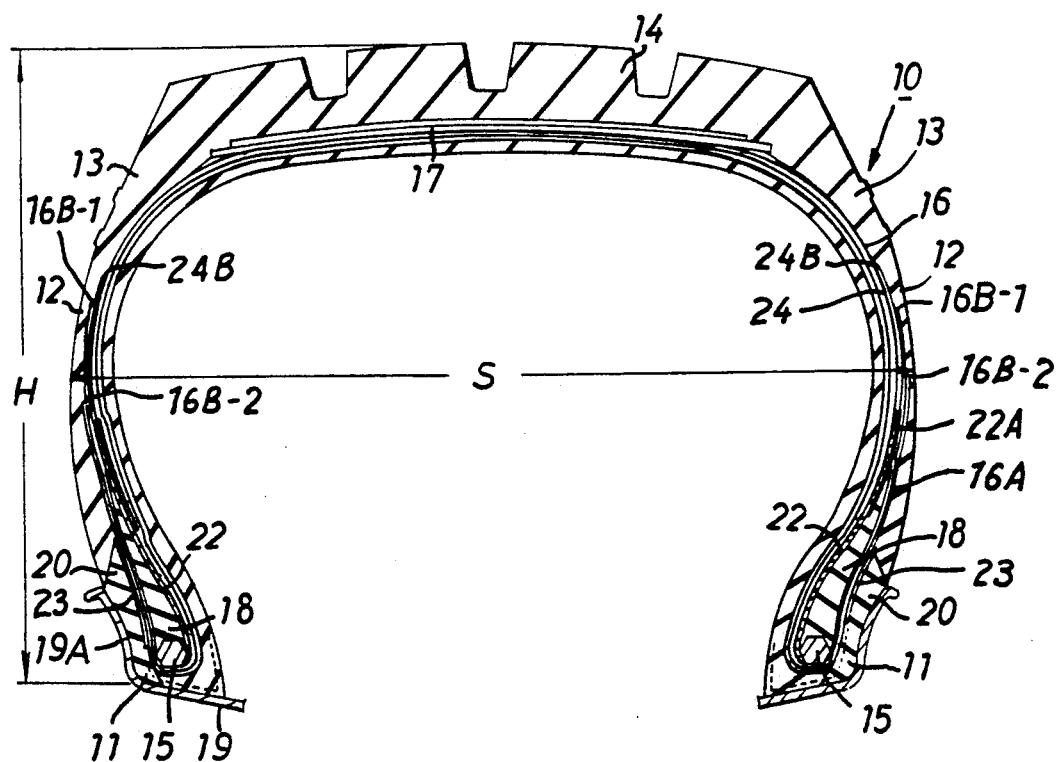
FIG. 3 is a sectional view showing another radial tire as a second embodiment of the invention.

FIGS. 3 and 4 show a second embodiment which has substantially the same construction as the first embodiment and wherein the length L1 of the bead filler rubber portion 18 and the length L3 of the rubber cushion 23 are the same as the respective corresponding lengths in the first embodiment. However, the length L2 of the reinforcing layer 22 is greater than in the first embodiment, and the outer end 22A of the reinforcing layer 22 is positioned between the carcass return end 16B-2 and the outer end 18A of the filler portion 18, preferably at the midportion between the return end 16B-2 and the filler outer end 18A. The reinforcing layer 22 of the second embodiment acts to diminish the tensile strain over an increased area, so that the rubber liner 24 can be dispensed with. However, it is more advantageous from the viewpoint of diminishing the tensile strain to provide the inner rubber lining 24 in the second embodiment as seen in the fourth embodiment of FIG. 6.

The third embodiment shown in FIG. 5 corresponds to the first embodiment from which the rubber liner 24 is eliminated. This embodiment nevertheless exhibits the minimum essential advantages contemplated by the present invention.

Throughout FIGS. 1 to 10, like parts are designated by like reference numerals or symbols. The bead 11 is fitted around the rim 19 having flanges 19A.

Table 1 below shows the properties of the rubbers forming the bead filler rubber portion 18, abrasion rubber member 20, rubber cushion 23 and rubber liner 24 of each of the foregoing embodiments.

TABLE 1

| Property | Bead filler rubber | Abrasion rubber | Cushion rubber, liner rubber |
|---|---|---|---|
| Modulus of elasticity (kg.f/cm²) M200 | 88 | 91 | 93 |
| Maximum elongation (%) EB | 430 | 380 | 420 |
| Rupture strength (kg.f/cm²) TS | 176 | 210 | 236 |
| Hardness (deg) HS | 88 | 73 | 66 |
| Tear strength (kg.f) Tr | 77 | 88 | 69 |
| Modulus of elasticity (kg.f/cm²) M100 | 48 | 35 | 34 |

Although the rubber for the cushion 23 preferably has the same properties as the rubber forming the reinforcing layer 22, i.e. the rubber 22D covering the organic fiber cords 22B, the rubber can be of different properties provided that it exhibits good adhesion to the abrasion rubber member 20.

To ensure steering stability, the bead filler rubber 18 needs to be at least 80 degrees in hardness HS. The high hardness (high modulus of elasticity) results in suppressed movement, substantially obviating the shearing force that would occur between the organic fiber cords of the reinforcing layer 22 and the filler rubber portion 18.

However, since the abrasion rubber 20 has a hardness of 70 to 75 degrees, a shearing force is likely to occur between the filler rubber portion 18 and the organic fiber cords to result in separation.

To diminish the shearing force, therefore, the cushion rubber 23 is made 5 to 10 degrees lower than the abrasion rubber 20 in hardness. Thus, the cushion rubber 23 is preferably 60 to 70 degrees in hardness.

When less than 60 degrees, the rubber cushion 23 provided has no significance, permitting creation of a great shearing strain, whereas the cushion 23, when exceeding 70 degrees, is as hard as the abrasion rubber 20 and fails to serve as a cushion.

Figure 18:
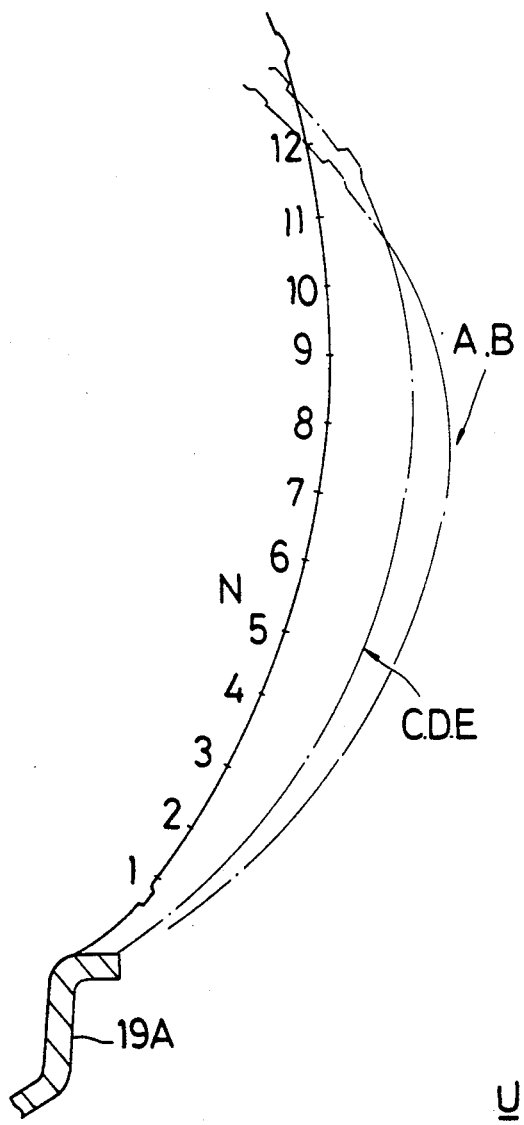
FIG. 18 is a diagram showing the results obtained by testing the embodiments and the examples for the deformation of the outer surface by loading the tires from a standard state.
Figure 13:
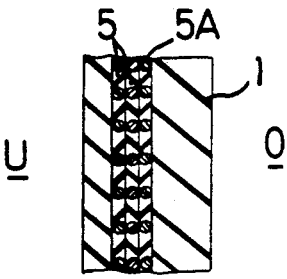
FIG. 13 is an enlarged view in section taken along the line a—a in FIG. 11.
Figure 14:
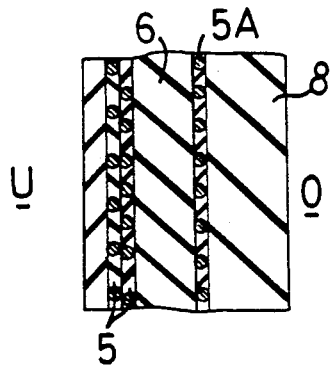
FIG. 14 is an enlarged view in section taken along the line b—b in FIG. 11.
Figure 15:
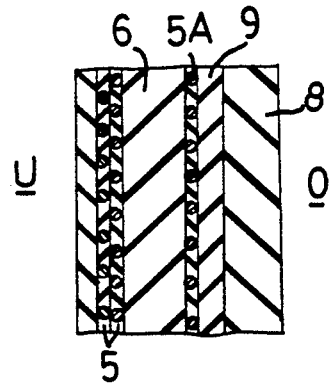
FIG. 15 is an enlarged view in section taken along the line b—b in FIG. 12.

FIGS. 16 to 18 and Table 2 below show the results obtained by testing the conventional examples 1 and 2 and the first, second and fourth embodiments of the invention. In FIGS. 16 to 18 and Table 2, the conventional example 1 is represented by A, the conventional example 2 by B, the first embodiment by C, the second by D and the fourth by E.

TABLE 2

| | A | B | C | D | E |
|---|---|---|---|---|---|
| Index of durability on drum | 100 | 150 | 250 | 200 | 250 |
| | *1 | *2 | *3' | *3 | *3' |
| | *2 | *3 | | *4 | *4' |
| Index of surface compressive strain above rim flange | 100 | 100 | 60 | 60 | 60 |
| Drum Test Conditions | | | | | |
| Drum diameter (mm): | | 1707 | | | |
| Speed (KPH): | | 50 | | | |
| Load (kg.f): | | 2760 | | | |
| Tire internal pressure: | | 5.5 | | | |
| Rim: | | 6½ L × 16 | | | |
| Tire size: | | T/L235/85R16 10 PR | | | |

In Table 2, the symbol *1 stands for separation between the abrasion rubber member and the carcass layer, *2 for cord break in carcass folded portion adjacent the flange, *3 for separation of the carcass return end, *4 for separation of the outer end of the reinforcing layer, and *3' and *4' for slight occurrence of the respective faults represented by *3 and *4.

Table 2 and FIGS. 16 to 18 reveal that when the tire in the standard state N shown in FIG. 18 is loaded, the deformation of the tire is inhibited according to the embodiments of the invention as indicated by C, D, E unlike the conventional examples 1, 2 which are deformed as represented by A and B. Further in respect of radial strains, the compressive strain is also inhibited in the vicinity of the bead according to the invention. Thus, the tires of the invention have high durability around the beads.

In brief, the tire of the present invention comprises a reinforcing layer of organic fiber having a bias angle of 40 to 60 degrees, adhered to the inner side of each bead filler rubber portion and extending along the filler portion from a position radially inwardly of the bead core, so that when the tire is loaded, the layer inhibits the tensile strain to be set up in the tire inside portion to preclude damage to the bead and impart enhanced durability to the tire.

In addition to the reinforcing layer, a rubber cushion 23 having 0.5 to 1.0 times the gauge of the carcass layer is provided between the carcass folded portion and the abrasion rubber member adjacent the rim flange to extend along the filler portion. The cushion inhibits the compressive strain to be set up in the tire outside portion when the tire is loaded. With both tensile and compressive strains thus inhibited, the tire is operable reliably free of breaks in the cords and separation between the components.

Furthermore, an inner rubber liner, when provided along the inner surface of the tire, effectively prevents the separation of the carcass return end.

What is claimed is:

1. A radial tire comprising:
   at least one carcass layer which extends between a pair of bead cores, such arrangement substantially conforming to a cross-section of the tire, the carcass layer comprising cords covered with rubber;
   a belt layer provided over a crown portion of the carcass layer radially outward of the tire;
   a bead filler rubber extending radially outwardly from an outer side of the bead cores, said bead filler rubber having a wedge shape in cross-section;
   said carcass layer extending around each of the bead cores from a bead toe to a bead heel and further extending radially outwardly to define a return portion of the carcass layer, wherein the return portion has an end being positioned radially outwardly from a radially outward end of the bead filler rubber;
   a reinforcing layer formed of organic fiber-made cords having a bias angle of 40 to 60 degrees covered with rubber, the reinforcing layer being adhered to an axially inner side of each bead filler rubber;
   a rubber cushion positioned between an abrasion rubber located adjacent to a rim flange and the carcass return portion such that the rubber cushion extends in a direction of each bead filler rubber;
   wherein a radially inward end of the reinforcing layer is positioned adjacent to an inner side of the bead core and at a point radially inward of a central axis of the bead core as viewed in a cross-section of the tire such that the radially inward end is pressed between the carcass layer and the bead core; and a radially outward end of the reinforcing layer is radially positioned between a radially outward end of the bead filler rubber and a radially outward end of the cushion rubber; and
   a rubber liner having a gauge of 0.5 to 1.5 times a gauge of the carcass layer and being inserted between the carcass layer and the return portion thereof;
   wherein the rubber liner has a radial length covering, from an axially inner side of the tire, the end of the carcass return portion, an end of each bead filler rubber positioned radially inwardly of the carcass end, and an end of the reinforcing layer positioned radially inwardly of each bead filler rubber; and
   wherein an overlapping portion of the radially outward end of the reinforcing layer and the radially inward end of the rubber liner is inserted between the carcass layer and the bead filler rubber.

2. A radial tire as defined in claim 1, wherein the radially outward end of the carcass return portion is positioned sectionally heightwise at approximately a 50% level of an overall cross-sectional tire height and the radially outward end of the bead filler rubber is positioned sectionally heightwise at approximately a 25% level of the overall cross-sectional tire height, and a length of the cushion rubber is not less than 30% of a length of the bead filler rubber and less than 100% of the length of the bead filler rubber.

3. A radial tire as defined in claim 1, wherein the reinforcing layer has a length longer than that of the bead filler rubber, and the radially outward end of the reinforcing layer is positioned radially between the radially outward end of the bead filler rubber and the radially outward end of the rubber liner.

4. A radial tire comprising:
   at least one carcass layer which extends between a pair of bead cores, such arrangement substantially conforming to a cross-section of the tire, the carcass layer comprising cords covered with rubber;
   a belt layer provided over a crown portion of the carcass layer radially outward of the tire;
   a bead filler rubber extending radially outwardly from an outer side of each of the bead cores, said bead filler rubber having a wedge shape in cross-section;
   said carcass layer extending around each of the bead cores from a bead toe to a bead heel and further extending radially outwardly to define a return portion of the carcass layer, wherein the return portion has an end being positioned radially outwardly from a radially outward end of the bead filler rubber;
   a reinforcing layer formed of organic fiber-made cords having a bias angle of 40 to 60 degrees and being covered with a rubber, each reinforcing layer being adhered to an axially inner side of the bead filler rubber;
   a rubber cushion positioned between an abrasion rubber located adjacent to a rim flange and the carcass return portion such that the rubber cushion extends in a direction of the bead filler rubber;
   wherein a radially inward end of the reinforcing layer is positioned adjacent to an inner side of the bead core and at a point radially inward of a central axis of the bead core as viewed in a cross-section section of the tire such that the radially inward end is pressed between the carcass layer and the bead core; and a radially outward end of the reinforcing layer is radially positioned between a radially outward end of the bead filler rubber and a radially outward end of the carcass return portion; and
   a rubber liner having a gauge of 0.5 to 1.5 times a gauge of the carcass layer and being inserted between the carcass layer and the return portion thereof;
   wherein the rubber liner has a radial length covering, from an axially inner side of the tire, the end of the carcass return portion, an end of the reinforcing layer positioned radially inwardly of each carcass end, and the radially outward end of the bead filler rubber positioned radially inwardly of the reinforcing layer end; and
   wherein an overlapping portion formed of the radially outward end of the reinforcing layer and the radially inward end of each rubber liner is inserted between the carcass layer and the bead filler rubber.

5. A radial tire as defined in claim 4, wherein the radially outward end of the carcass return portion is positioned sectionally heightwise at approximately a 50% level of an overall cross-sectional tire height and the radially outward end of the bead filler rubber is positioned sectionally heightwise at approximately a 25% level of the overall cross-sectional tire height, and a length of the cushion rubber is not less than 30% of a length of the bead filler rubber and less than 100% of the length of the bead filler rubber.

* * * * *